Z. OLSSON.
APPARATUS FOR DETERMINING THE QUANTITY OF CARBON DIOXID IN FLUE GASES.
APPLICATION FILED MAR. 29, 1917.

1,260,020.

Patented Mar. 19, 1918.
2 SHEETS—SHEET 1.

Z. OLSSON.
APPARATUS FOR DETERMINING THE QUANTITY OF CARBON DIOXID IN FLUE GASES.
APPLICATION FILED MAR. 29, 1917.
1,260,020.
Patented Mar. 19, 1918.
2 SHEETS—SHEET 2.
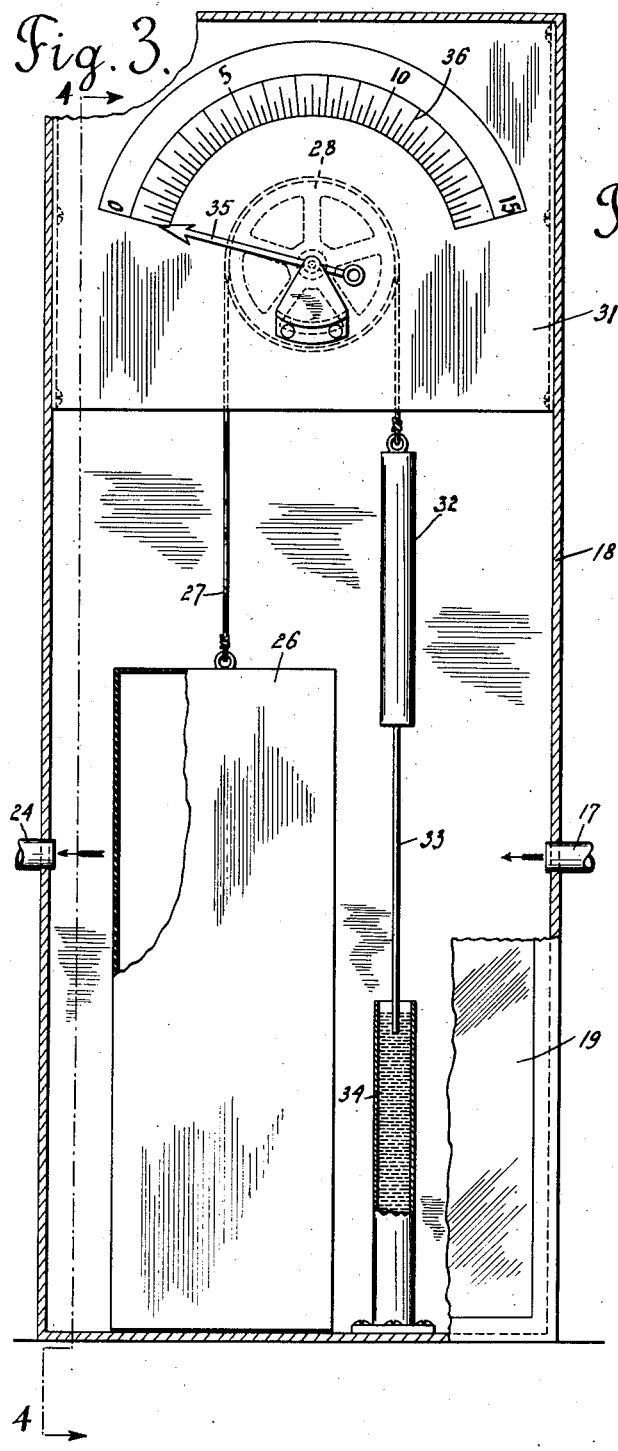
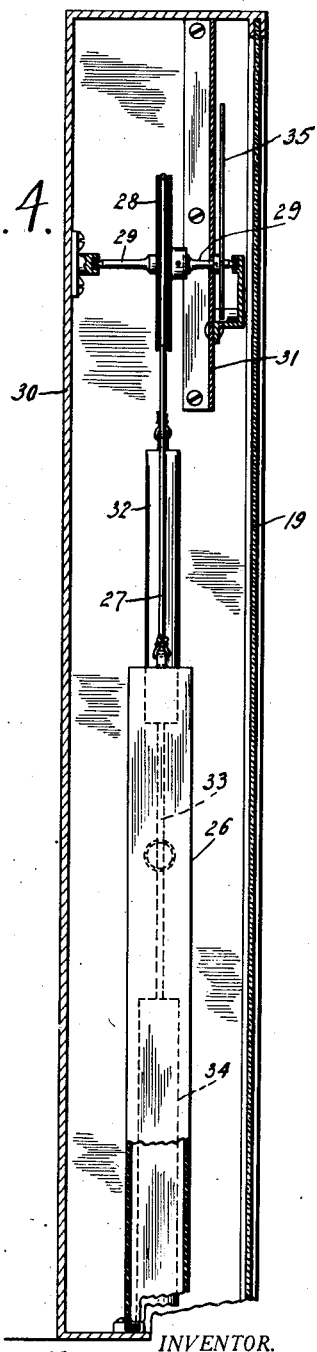
INVENTOR.
Z. Olsson
BY Sigmund Herzog
his ATTORNEY

UNITED STATES PATENT OFFICE.

ZACHARIAS OLSSON, OF NEW YORK, N. Y., ASSIGNOR TO AUGUST RUST-OPPENHEIM, OF NEW YORK, N. Y.

APPARATUS FOR DETERMINING THE QUANTITY OF CARBON DIOXID IN FLUE-GASES.

1,260,020.

Specification of Letters Patent.   Patented Mar. 19, 1918.

Application filed March 29, 1917. Serial No. 158,330.

*To all whom it may concern:*

Be it known that I, ZACHARIAS OLSSON, a citizen of the United States, and a resident of the city of New York, in the county of New York and State of New York, have invented certain new and useful Improvements in Apparatus for Determining the Quantity of Carbon Dioxid in Flue-Gases, of which the following is a specification.

The present invention relates to an apparatus for determining the quantity of carbon dioxid in flue-gases.

As far as known, heretofore in methods and devices of this type there were generally employed chemicals for absorbing or otherwise separating the carbon dioxid from the flue-gases. These methods, besides that they are cumbersome, can only be practised by persons skilled in chemistry, necessitate frequent taking of samples from the flue and, consequently, involve a great amount of work.

The main object of the present invention is to construct a simple and efficient apparatus for the purpose specified, which does away with the use of chemicals, and automatically and continuously indicates the amount of carbon dioxid contained in the flue-gases, showing, at the same time, the variation thereof.

With these and other objects in view, which will more fully appear as the nature of the invention is better understood, the same consists in the combination, arrangement, and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1:
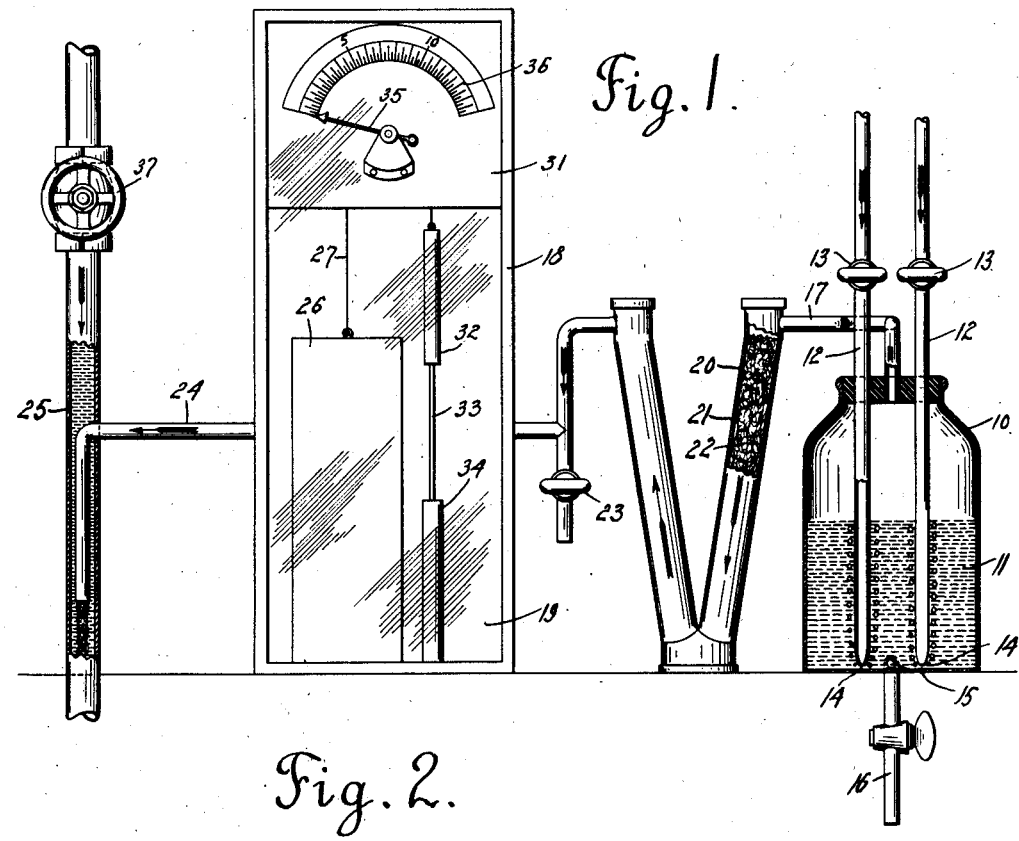
Figure 2:
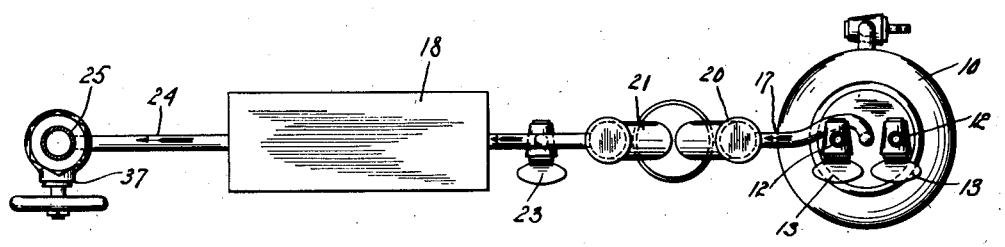

Figure 1 is a front elevation, partly in section, of an apparatus constructed in accordance with the present invention; Fig. 2 is a top plan view thereof; Fig. 3 is a vertical longitudinal section taken through the indicating mechanism; and Fig. 4 is a section taken on line 4—4 of Fig. 3.

Broadly speaking, the apparatus consists of a closed receptacle, through which the flue-gases are caused to flow, and in which is disposed a buoyant body that actuates an indicator, adjacent to which is located a graduated scale. The theory on which the device is based is that the buoyancy of the body above mentioned varies in direct proportion to the specific gravity of the gases flowing through the closed receptacle.

Referring now to the drawings, the numeral 10 indicates a closed container, made preferably of glass and containing a liquid 11, such as water. The container is filled only partly with this liquid. Into this container leads a plurality of pipes 12, which are connected with the flue, the gases of which are to be analyzed. These pipes are provided with cocks 13 immediately above the container, and their lower ends are open, as clearly shown at 14, the said lower ends being disposed a short distance above the bottom of the container, thereby permitting the flue-gases to flow into the container. As the gases are conducted through the liquid, they are partly cooled and, on the other hand, the liquid separates therefrom part of the dust, cinders, and other foreign matter. The container is provided near its bottom with an outlet 15, from which leads a cock-controlled pipe 16, permitting the liquid and the foreign matter therein to be emptied from the container, from time to time.

From the top of the container leads a pipe 17 to a closed receptacle 18. One of the walls of this receptacle, in the case illustrated the front wall 19, is made of glass to permit of a continuous inspection of the elements therein. Into the pipe 17 is inserted a filter 20, consisting of a preferably V-shaped tubular body 21, containing a filtering material 22, such as, for instance, cotton. The purpose of this filtering material is to remove from the flue-gases such foreign matter as may still float therein after its passage through the liquid in the container 10. Between the filter and the receptacle 18 there is provided in the pipe 17 a cock 23, to permit sample gases to be drawn from the device after they have been filtered.

From the receptacle 18 leads a pipe 24, forming with a water-pipe 25 an ejector for the purpose of exhausting initially the gas from the receptacle 18, and thereafter to produce a continuous flow of the flue-gases through the said receptacle. This ejector may be of any suitable construction, the one herein shown having been disclosed for purposes of illustration only.

Within the receptacle 18 is disposed a buoyant body 26, preferably a bag made of an expansible material, such as for instance rubber. To this body is fixed one end of a cord 27, that runs over a sheave 28, the latter being provided with trunnions 29 which are suitably journaled in the rear wall 30 of the receptacle and in a partition 31 therein. The other end of the cord is attached to a balancing weight 32, to the lower end of which is rigidly secured a bar 33, reaching into a pot 34 that is filled with oil or a similar fluid. To one of the trunnions of the sheave is fixedly attached a hand 35, adjacent to which is provided, upon the partition 31, a graduated scale 36.

The operation of this device is as follows: The buoyant body is filled with pure air and its weight and that of the balance 32 are such as to cause the said buoyant body to keep its lowermost position when the receptacle 18 is filled with air. To start the operation of the device, the faucet 37 in the water-pipe 25 is set to its open position, permitting water to flow through the said pipe, which will cause a continuous flow of the flue-gases through the apparatus. If the flue-gases flow through the closed receptacle 18 and contain the least amount of carbon dioxid, they immediately change the buoyancy of the body 26. It is to be noted that the specific gravity of carbon dioxid is 22, it is thus 1.53 times heavier than air. Obviously, the more carbon dioxid contained in the flue-gases, the greater is its specific gravity and the higher will the body 26 rise. As this body rises, the cord 27 causes the sheave to turn, whereby the hand will move along the scale 36, showing the percentage of the carbon dioxid contained in the flue-gases. It is obvious that changes of the carbon dioxid in the flue-gases cause the buoyant body to fluctuate, that is to say to rise and descend, such changes being clearly readable on the graduated scale.

The rod 33 and the pot 34 act as a dashpot, that is to say they prevent the counterbalancing weight 32 from overrunning.

The body 26 is extensible to permit the air therein to expand, due to the rise of temperature in the receptacle 18.

What I claim is:

1. In a device of the character described, the combination with a closed receptacle, of means for inducing a flow of gas therethrough, a buoyant expansible body in said receptacle, and means connected with said body for indicating the changes of the positions of said body caused by the changes of the specific gravity of the gas flowing through said receptacle.

2. In a device of the character described, the combination with a closed receptacle, of means for inducing a flow of gas therethrough, a buoyant expansible body in said receptacle, a graduated scale, a hand movable along said scale, and a connection between said buoyant body and said hand for causing the latter to move along the scale as said body changes its positions due to the changes of the specific gravity of the gas flowing through said receptacle.

Signed at New York, in the county of New York, and State of New York, this 24th day of March, A. D. 1917.

ZACHARIAS OLSSON.